Oct. 31, 1944.  C. C. TAYLOR  2,361,886
GROUND TREATING TOOL
Filed June 5, 1943
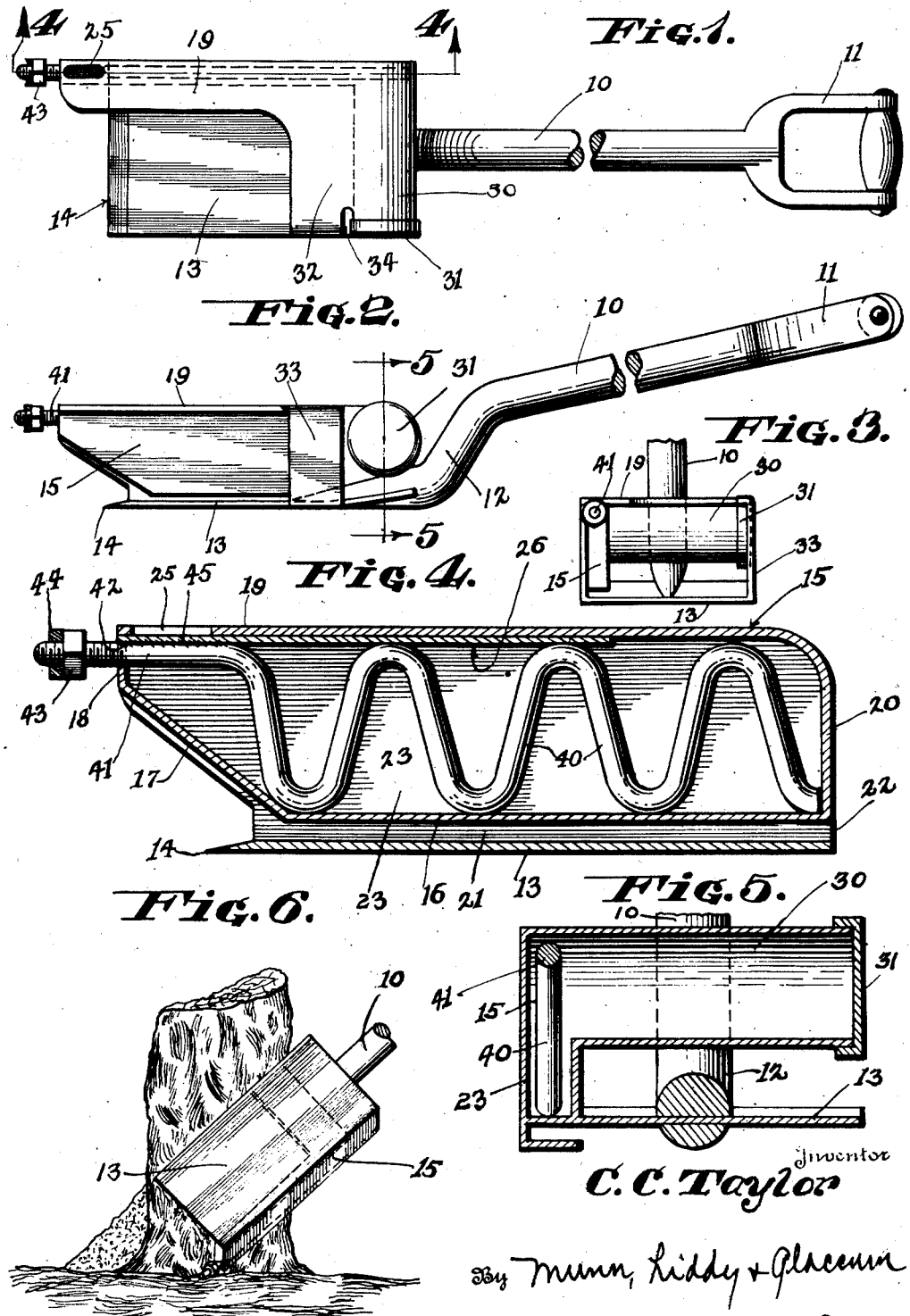

Patented Oct. 31, 1944

2,361,886

UNITED STATES PATENT OFFICE 2,361,886

GROUND TREATING TOOL

Clarence C. Taylor, Mounds, Ill.

Application June 5, 1943, Serial No. 489,834

6 Claims. (Cl. 47—49)

This invention relates to ground treating tools.

An object of the invention is the provision of a tool in the form of a shovel which may be employed for digging holes to receive an insecticide which is forced from a container carried by one edge of the shovel.

Another object of the invention is the provision of a ground treating tool for applying an insecticide to pockets in the ground, said tool being in the form of a shovel on which a casing is secured to one edge of the shovel with means in the casing for forcing the insecticide through an opening at the forward end of the casing for depositing said insecticide in the ground.

A further object of the invention is the provision of a ground treating tool for supplying an insecticide to the ground in the vicinity of the roots of a tree for killing insects or worms which are destructive to the trees, the tool having a casing which is supplied with an insecticide with means in the casing for forcing the insecticide from an opening, said means also being employed for agitating and breaking up the materials in the casing so that they will always be in condition to be discharged.

This invention will be best understood from a consideration of the following detailed description, in view of the accompanying drawing forming a part of the specification, nevertheless, it is to be understood that the invention is not confined to the disclosure, being susceptible of such changes and modifications as define no material departure from the salient features of the invention as expressed in the appended claims.

In the drawing:

Fig. 1 is a plan view of the tool which is constructed in accordance with the principles of my invention.

Fig. 2 is a side view of the same.

Fig. 3 is a fragmentary end view of the tool.

Fig. 4 is a longitudinal section taken along the line 4—4 of Fig. 1.

Fig. 5 is a transverse vertical section taken along the line 5—5 of Fig. 2.

Fig. 6 is a view in perspective of the tool shown in operative relation adjacent the trunk of a tree.

Referring more particularly to the drawing, 10 designates a handle of the usual type, which is employed in a tool known as a spade or shovel, and this handle is provided with the usual hand grip 11. The handle is also provided with an offset portion 12 where it is connected to the spade or shovel 13 per se. The outer end of the shovel as shown at 14 is sharpened to facilitate the penetration of the shovel or spade into the ground.

The casing 15 is secured along one edge of the shovel 13 and the bottom 16 of the casing is spaced from the shovel 13. This casing has a front end 17 which is inclined to the base portion 16 and which terminates in a vertically reduced front wall 18 providing a reduced front end for the casing. The casing is provided with a top 19 and a rear wall 20.

As has been stated, the bottom 16 of the casing 15 is spaced from the shovel 13 to provide a longitudinal passage 21, which extends from the front end of the shovel to the rear end where it opens at 22 to the atmosphere. By this construction dirt which would tend to collect in the passage 21 can normally escape through the open rear end 22.

The outer side wall 23 of the casing is extended below the bottom 16 and the lower end of this side wall is secured to the shovel for partially supporting the casing 15 on the shovel.

The top 19 of the casing is provided with an opening 25 at its forward end and adjacent a vertical wall 18 to provide a discharging passage for an insecticide which is placed within the casing 15. This opening is normally closed by a slide or cover 26, which is maintained in contact with the inner face of the top 19 of the casing.

A storage chamber 30 is disposed transversely of the shovel and at the rear end adjacent the offset portion 12 of the handle 10. One end of this storage chamber is provided with a removable closure 31. The opposite end of this chamber opens directly into the casing 15, as shown in Fig. 5.

It will be noted from Figs. 1, 2 and 5, that the top 19 of the casing 15 extends transversely of and in spaced relation with the shovel 13 as shown at 32. The extension 32 has a downward projection 33 which is secured to an edge of the shovel. The extension 32 furthermore forms a continuation of the wall of the storage chamber 30. However, this extension 32 is cut away as shown at 34 to provide sufficient space for the operation of the cap over closure 31.

A metal rod formed of spring steel or other suitable material is provided with convolutions as shown at 40 and these convolutions are located within the casing 15. One end of this rod as shown at 41 forms a plunger; extends forwardly through a passage 42 in the vertical wall 18 or reduced end of the casing and projects outwardly therefrom. A nut 43 is threaded on the outer end of the rod and a lock nut 44 is also applied to the outer end to prevent the loss of the nut 43. The height of the convolutions 40 is such that they are freely movable within the narrow casing 15 for agitating the insecticide stored therein and for aiding in its discharge through the opening 25.

It will be noted that the cover or closure 26 for the opening 25 is welded or secured in any approved manner as shown at 45 to the rod 41 so that when the rod is moved inwardly of the casing the cover 26 will be moved rearwardly for exposing the opening 25 for the discharge of the insecticide.

In view of the fact that the tool is in the form of a shovel or spade a portion 13 of the tool can be used for digging holes in the ground around the roots of a tree at a predetermined distance therefrom, after which the outer end of the rod 41 may be forced against a hard object such as a stone or piece of wood whence the rod may be forced inwardly and the opening 25 will be exposed for discharging the insecticide into the hole in the ground, after which the hole will be closed.

Any well known insecticide may be employed, such as paradichlorobenzene or ethylene dichloride emulsion. In any event after the insecticide is placed in the ground it will evaporate and the gases will spread through the ground and kill the vermin which is destructive to trees.

In an endeavor to get rid of the usual destructive borer a circular trench is dug around the tree and the insecticide is placed therein and then covered over.

It will be seen by this construction that a simple and efficient tool is provided, which can be used not only for supplying the insecticide to the soil, but the same tool can be used for digging the trench or gutter which is to receive the insecticide. Furthermore, all of the elements except the rod with its convolutions can be made as as integral whole.

I claim:

1. A tool for supplying an insecticide comprising a shovel including a handle and a cutting edge, a casing mounted along one edge of the shovel and having a reduced end adjacent the cutting edge, said reduced end having a passage, the top of the casing adjacent the reduced end having a discharge opening, a spring having convolutions in the casing, a plunger on the forward end of the spring projecting through the passage, said plunger adapted to be reciprocated to cause the spring to force an insecticide from the casing, and a container supplied with an insecticide, mounted on the rear portion of the shovel and being in open communication with the rear end of the casing for supplying the insecticide to said casing.

2. A tool for supplying an insecticide comprising a shovel including a handle and a cutting edge, a casing mounted along one edge of the shovel and having a reduced end adjacent the cutting edge, said reduced end having a passage, the top of the casing adjacent the reduced end having a discharge opening, a spring having convolutions in the casing, a plunger on the forward end of the spring projecting through the passage, a cover located in the casing and connected to the plunger for normally closing said opening, said cover being movable away from the opening when the plunger is forced against the ground, and a container supplied with an insecticide, mounted on the rear portion of the shovel and being in open communication with the rear end of the casing for supplying the insecticide to said casing.

3. A tool for supplying an insecticide comprising a shovel including a handle and a cutting edge, a casing mounted along one edge of the shovel and having a reduced end adjacent the cutting edge, said reduced end having a passage, the top of the casing adjacent the reduced end having a discharge opening, a spring having convolutions in the casing, a plunger on the forward end of the spring projecting through the passage, means for closing the discharge opening, said means being carried by the plunger and adapted to be moved away from the opening when the plunger is reciprocated, and a container supplied with an insecticide, mounted on the rear portion of the shovel and being in open communication with the rear end of the casing for supplying the insecticide to said casing.

4. A tool for supplying an insecticide to soil comprising a shovel including a handle and a cutting edge, an elongated closed casing mounted along one edge of the shovel and having a reduced end adjacent the cutting edge with an inclined bottom portion at the reduced end leading to said end, said reduced end having a passage, a resilient rod having convolutions in the casing and an end projecting through the passage, the top of the casing adjacent the reduced end having a discharge opening, a closure secured to the rod and normally covering the opening but adapted to be moved away from the opening when the projecting end of the rod is forced against an obstacle to move the convolutions and cause the insecticide to be forced through the opening, and a container on the shovel, in open communication with the casing and filled with an insecticide for supplying the casing with the insecticide.

5. A tool for supplying an insecticide to soil comprising a shovel including a handle and a cutting edge, an elongated closed casing mounted along one edge of the shovel and having a reduced end adjacent the cutting edge with an inclined bottom portion at the reduced end leading to said end, said reduced end having a passage, a resilient rod having convolutions in the casing and an end projecting through the passage, the top of the casing adjacent the reduced end having a discharge opening, a closure secured to the rod and normally covering the opening but adapted to be moved away from the opening when the projecting end of the rod is forced against an obstacle to move the convolutions and cause the insecticide to be forced through the opening, and a container on the shovel in open communication with the casing and filled with an insecticide for supplying the casing with the insecticide, the bottom of the casing being spaced from the shovel to permit dirt to slide under the casing when the shovel is being used in the usual manner.

6. A device for supplying an insecticide to soil comprising a shovel including a handle and a cutting edge, a narrow elongated container mounted along one edge of said shovel and adapted to be filled with an insecticide, the top of the container at its forward end having a discharge opening, the forward end being reduced and provided with a passage, a rod formed of resilient material and provided with convolutions which are located in the container, one end of the rod projecting through the passage, a head on the projecting end of the rod adapted to be engaged by the ground for causing flexing of the convolutions for forcing the insecticide through the discharge opening, and a cover plate secured to the rod for normally closing the opening but adapted to be moved away from said opening when the projecting end of the rod is moved inwardly.

CLARENCE C. TAYLOR.